(12) United States Patent
Shan et al.

(10) Patent No.: US 10,201,058 B2
(45) Date of Patent: Feb. 5, 2019

(54) METHOD DETERMINING THE SUITABLE LIGHTING FOR AN ACTIVITY

(71) Applicant: PHILIPS LIGHTING HOLDING B.V., Eindhoven (NL)

(72) Inventors: Caifeng Shan, Eindhoven (NL); Radu Serban Jasinschi, Nuenen (NL); Ronaldus Maria Aarts, Geldrop (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/510,402

(22) PCT Filed: Sep. 7, 2015

(86) PCT No.: PCT/EP2015/070345
§ 371 (c)(1),
(2) Date: Mar. 10, 2017

(87) PCT Pub. No.: WO2016/037965
PCT Pub. Date: Mar. 17, 2016

(65) Prior Publication Data
US 2017/0265272 A1    Sep. 14, 2017

(30) Foreign Application Priority Data
Sep. 11, 2014   (EP) .................................... 14184349

(51) Int. Cl.
*H05B 37/02*    (2006.01)

(52) U.S. Cl.
CPC ..... *H05B 37/0218* (2013.01); *H05B 37/0227* (2013.01); *H05B 37/0272* (2013.01); *Y02B 20/46* (2013.01)

(58) Field of Classification Search
CPC .......... H05B 37/0245; H05B 37/0254; H05B 41/3925; H05B 41/391; H05B 41/2828; H05B 33/0803; H05B 37/0272
(Continued)

(56) References Cited

U.S. PATENT DOCUMENTS

2012/0194419 A1* 8/2012 Osterhout .......... G02B 27/0093
                                                       345/156
2012/0212406 A1* 8/2012 Osterhout ............ G02B 27/017
                                                       345/156
(Continued)

FOREIGN PATENT DOCUMENTS

CN         106664783 A        5/2017
EP           2759778 A1       7/2014
(Continued)

*Primary Examiner* — Douglas W Owens
*Assistant Examiner* — Syed M Kaiser
(74) *Attorney, Agent, or Firm* — Meenakshy Chakravorty

(57) ABSTRACT

Disclosed is a method for improving a lighting condition with a wearable computing device (100), the method comprising determining (302) an actual light condition with an optical sensor arrangement (114, 220); determining (303) the user activity with a further sensor arrangement (116, 230) for determining a user activity, said user activity being associated with a suitable lighting condition for performing said activity; comparing (304), on the wearable computing device, the actual light condition with the suitable light condition; and generating (306, 406) a signal with the wearable device if the actual light condition deviates from the suitable light condition. A computer program product including computer program code for implementing this method when executed on a wearable computing device (100), a wearable computing device (100) including the computer program product and a lighting system kit includ-
(Continued)

ing a lighting system (200) and the wearable computing device (100) are also disclosed.

14 Claims, 5 Drawing Sheets

(58) Field of Classification Search
USPC .......................................... 315/130, 152, 291
See application file for complete search history.

(56) References Cited

U.S. PATENT DOCUMENTS

| | | | |
|---|---|---|---|
| 2012/0235900 A1* | 9/2012 | Border | G02B 5/23 345/156 |
| 2012/0262069 A1* | 10/2012 | Reed | H05B 37/0218 315/130 |
| 2014/0244209 A1* | 8/2014 | Lee | G06K 9/00536 702/150 |
| 2014/0275850 A1* | 9/2014 | Venkatraman | A61B 5/0002 600/301 |
| 2016/0026253 A1* | 1/2016 | Bradski | G02B 27/225 345/8 |
| 2016/0192458 A1* | 6/2016 | Keith | H05B 37/0209 315/291 |

FOREIGN PATENT DOCUMENTS

| | | |
|---|---|---|
| GB | 2489394 A | 3/2012 |
| WO | 2013102855 A1 | 7/2013 |
| WO | WO2014033571 A2 | 3/2014 |

\* cited by examiner

METHOD DETERMINING THE SUITABLE LIGHTING FOR AN ACTIVITY

CROSS-REFERENCE TO PRIOR APPLICATIONS

This application is the U.S. National Phase application under 35 U.S.C. § 371 of International Application No. PCT/EP2015/070345, filed on Sep. 7, 2015, which claims the benefit of European Patent Application No. 14184349.0, filed on Sep. 11, 2014. These applications are hereby incorporated by reference herein.

FIELD OF THE INVENTION

The present invention relates to a method for improving a lighting condition of a user activity.

The present invention further relates to a computer program product for implementing such a method.

The present invention yet further relates to a wearable computing device adapted to implement such a control method.

The present invention still further relates to lighting system kit adapted to be controlled by such a method.

BACKGROUND OF THE INVENTION

The introduction of new lighting technologies such as solid state lighting has revolutionized the provisioning of lighting solutions, for instance by a shift from functional lighting to decorative lighting systems designed to create aesthetic lighting effects, e.g. complex lighting atmospheres created by multiple light sources to create a particular ambiance in a space such as a room, theatre, office and so on, as the light sources of the lighting system are typically configurable, e.g. programmable, to create light of varying colour, colour temperature intensity and/or periodicity, e.g. constant lighting, pulsed lighting, flashing lighting and so on. Such lighting systems therefore allow a user to create user-defined ambiances or by configuring individual light sources or combinations of light sources in the lighting system to create a desired lighting atmosphere.

Such lighting systems may give the user greater control over the lighting conditions considered optimal or suitable for a particular user activity performed by the user, e.g. reading, computing, watching television, dining and so on. However, the user may not always be committed to ensuring that the user activity and the lighting conditions are appropriately matched, or may even be unaware of the fact that the lighting conditions are unsuitable, e.g. non-optimal, for the task at hand. Consequently, there exists a need to support the user in ensuring that a particular user activity is performed under suitable lighting conditions.

SUMMARY OF THE INVENTION

The present invention seeks to provide a method for improving such a lighting condition that may support a user in the lighting optimization task.

The present invention further seeks to provide a computer program product for implementing such a method.

The present invention yet further seeks to provide a wearable computing device adapted to execute such a computer program product.

The present invention still further seeks to provide a lighting system kit including such a wearable computing device.

According to an aspect, there is provided a method for improving a lighting condition with a wearable computing device including an optical sensor for determining an actual lighting condition in a field of view of a wearer of the wearable computing device, the method comprising determining the actual light condition with the optical sensor; determining an actual user activity with a further sensor arrangement, said actual user activity being associated with a suitable lighting condition for performing said actual user activity; comparing, on the wearable computing device, the actual light condition with the suitable light condition; and generating a signal with the wearable device if the actual light condition deviates from the suitable light condition.

The present invention is based on the insight that a wearable computing device such as a head-mountable computing device can be used to determine whether the activity engaged in by the user is performed under optimal or otherwise suitable lighting conditions by determining both the actual lighting conditions that the wearer of the device, i.e. the user, experiences, e.g. using an optical sensor such as a light sensor or an image capture sensor such as a camera arranged to determine the lighting condition in the field of view of its user (wearer), as well as the activity the user is engaged in using a sensor for detecting an object associated with the activity, e.g. an image capture sensor or for detecting a user command specifying the user activity, e.g. an image capture sensor, a motion sensor, input sensor such as one or more keys and so on. The processor of the wearable computing device compares the actual lighting condition with a suitable lighting condition to determine if the actual lighting condition in the field of view of its wearer needs adjustment, e.g. is sub-optimal, in which case the wearable computing device generates a signal indicative of the need to adjust, i.e. improve, the actual lighting condition. The ability to determine the actual lighting conditions in the field of view of the user with such a wearable device therefore facilitates an improved accuracy over the control of the lighting conditions under which the user engages in such user activities.

For instance, the step of generating the signal comprising generating a warning signal with said wearable computing device for its user. Such a warning signal for instance may be an audible signal generated on an audio output unit of the wearable computing device such as a speaker, a displayed signal on a display of the wearable computing device, e.g. a head-mounted display, which may be a transparent display, or a sensory signal such as a blinking light or a vibration, to trigger the wearer to take action to adjust the lighting conditions.

Alternatively, the step of generating the signal may comprise generating a control signal for adjusting the actual lighting condition for at least one light source responsible for creating the actual lighting condition such that the lighting condition may be adjusted automatically, e.g. by communicating the control signal to said at least one light source and adjusting the at least one light source in accordance with the control signal.

In an embodiment, the suitable lighting condition comprises a glare threshold, and wherein the step of adjusting the at least one light source in accordance with the control signal comprises adjusting the at least one light source to reduce the glare produced by said at least one light source to below said glare threshold. This for instance is particularly advantageous if the wearer of the wearable computing device is watching a screen, e.g. a screen of a television, computer, tablet device, e-reader, mobile communication device and so on, as it ensures that the user interaction with the screen can take place in a manner that is satisfactory to the user.

The optical sensor may form part of an optical sensor arrangement that further comprises at least one further optical sensor communicatively coupled to the wearable computing device. The determination of the actual lighting condition in some embodiments may thus be enhanced by the use of a plurality of distributed sensors, e.g. including auxiliary sensors of e.g. a lighting system, which facilitates the accurate detection of more complex actual lighting conditions, e.g. by detecting the actual lighting condition under various angles.

The further sensor arrangement may comprise at least one of a first further sensor integral to the wearable computing device and at least one second further sensor communicatively coupled to the wearable computing device. The determination of the user activity may in some embodiments thus be achieved by a plurality of distributed further sensors, e.g. including auxiliary further sensors of e.g. a lighting system, which facilitates the accurate detection of a user activity, e.g. by detecting the user activity under various angles.

In an embodiment, the method may further comprise determining a further lighting condition with the optical sensor arrangement; associating a further user activity with the further lighting condition; and storing the further lighting condition as the suitable lighting condition for said further user activity. In this manner, the wearable computing device may be programmed to recognize preferable lighting conditions, e.g. by the wearer of the wearable computing device setting a preferable lighting condition for a particular activity and programming wearable computing device to store the preferable lighting condition as the suitable lighting condition for that activity.

In an embodiment, the step of determining the actual user activity with the further sensor arrangement comprises detecting a user input indicative of said actual user activity, such as a gesture, movement or other user input. This simplifies the actual user activity detection process.

The method may further comprise identifying the at least one light source with the wearable computing device such that the wearable computing device can direct a control signal to the identified light source for adjusting a setting of the light source if this light source is involved in the generation of the suitable lighting condition.

The method may further comprise repeating the steps of, during said user activity, determining a further actual light condition with the optical sensor arrangement; comparing the further actual light condition with the suitable light condition; and generating a further control signal for adjusting a setting of at least one light source for creating the suitable lighting condition if the further actual light condition deviates from the suitable light condition. In this manner, changes in the lighting condition during the execution of the actual user activity can be detected and compensated for, such that the user is guaranteed to perform the entire activity under suitable, e.g. optimal, lighting conditions, even if the user is on the move.

According to another aspect, there is provided a computer program product comprising computer program code for, when executed on a processor of a wearable computing device, implementing the steps of the method of one or more of the aforementioned embodiments. Such a computer program product may be made available to the wearable computing device in any suitable form, e.g. as a software application (app) available in an app store, and may be used to configure the wearable computing device such that the wearable computing device can implement the aforementioned method.

According to yet another aspect, there is provided a wearable computing device comprising a data storage including the aforementioned computer program product; an optical sensor for determining an actual lighting condition in a field of view of a wearer of the wearable computing device and a processor adapted to execute the computer program code of said computer program product.

The wearable computing device may further comprise a further sensor for determining the actual user activity. Such a wearable computing device is therefore capable of facilitating the optimization of a lighting condition in accordance with one or more embodiments of the aforementioned method.

In an embodiment, the optical sensor is at least one of a light sensor and an image capturing sensor; and/or the further sensor is at least one of an image capturing sensor and a motion sensor.

According to a further aspect, there is provided a lighting system kit comprising a lighting system including at least one light source and the aforementioned wearable computing device, wherein the lighting system is adapted to communicate with the wearable computing device and is responsive to a control signal generated by the wearable computing device for controlling the at least one light source. Such a lighting system kit facilitates the automatic control of a lighting condition as a function of a user activity.

BRIEF DESCRIPTION OF THE DRAWINGS

Embodiments of the invention are described in more detail and by way of non-limiting examples with reference to the accompanying drawings, wherein FIG. 1 schematically depicts a lighting system and wearable computing device according to an embodiment.

DETAILED DESCRIPTION OF THE EMBODIMENTS

Figure 1:
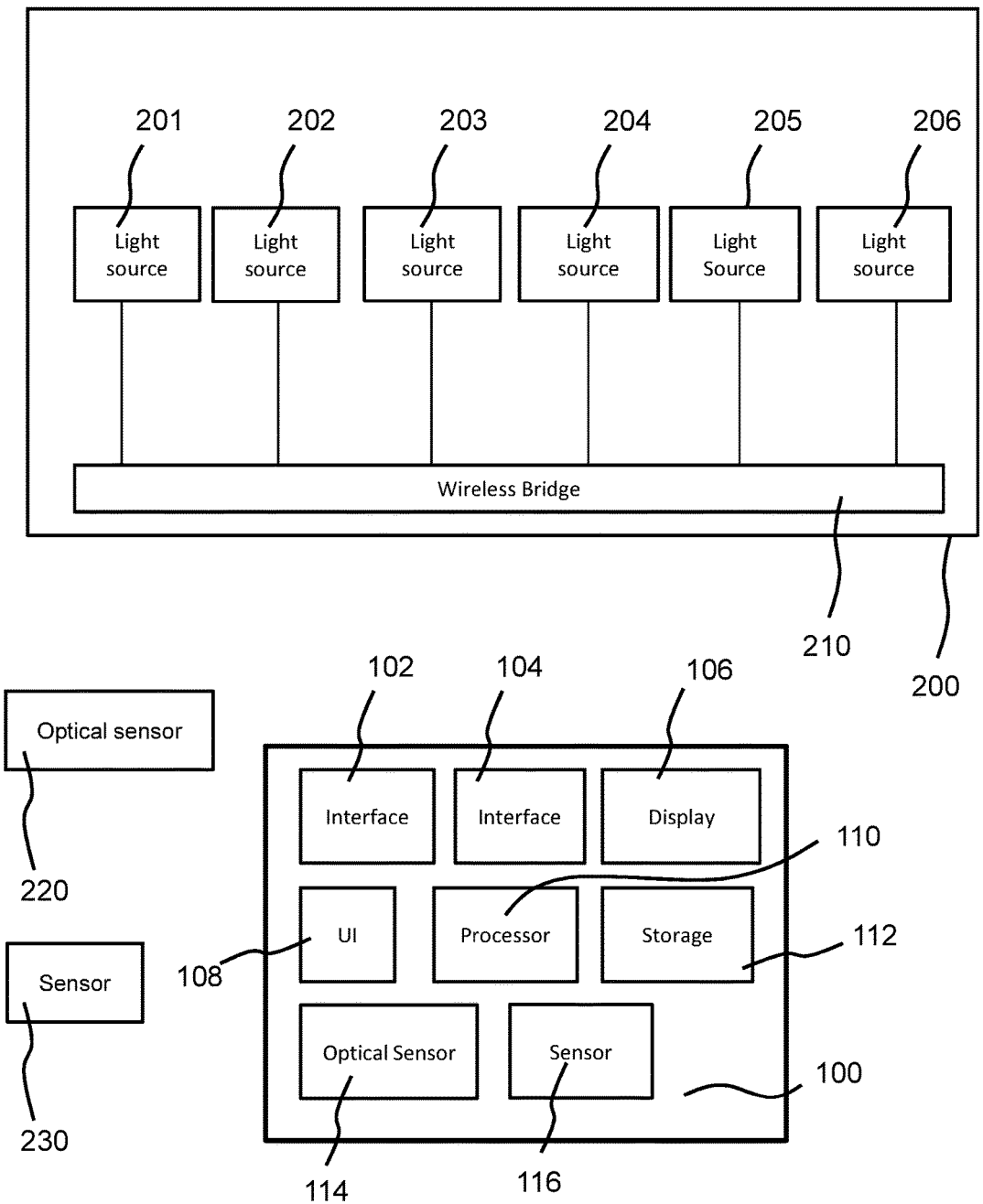

It should be understood that the figures are merely schematic and are not drawn to scale. It should also be understood that the same reference numerals are used throughout the Figures to indicate the same or similar parts.

In the context of the present application, a wearable computing device is a device that provides a user with computing functionality and that can be configured to perform specific computing tasks as specified in a software application (app) that may be retrieved from the Internet or another computer-readable medium. A wearable computing device may be any device designed to be worn by a user on a part of the user's body and capable of performing computing tasks in accordance with one or more aspects of the present invention. Non-limiting examples of such wearable devices include smart headgear, e.g. eyeglasses, goggles, a helmet, a hat, a visor, a headband, or any other device that can be supported on or from the wearer's head, smart watches, and so on.

In the context of the present application, the wearable computing device comprises an optical sensor for determining an actual lighting condition in a field of view of a wearer of the wearable computing device. The optical sensor may be arranged such that when worn as intended, the optical sensor aligns with the eyes of its wearer, i.e. produces a forward-facing sensor signal derived from the field of view of its wearer.

Such an optical sensor may be integral to the wearable computing device, e.g. integral to a head-mountable computing device, such as integrated in a lens of a head-mountable computing device through which its wearer observes its field of view, in a lens holder or frame for such a lens, or in any other suitable structure of the head-mountable computing device in which the optical sensor aligns with the field of view of the wearer of the head-mountable computing device.

Alternatively, such an optical sensor may be part of a modular wearable computing device, e.g. a head-mounted optical sensor modules communicatively coupled via a wired or wireless connection to one or more other modules of the wearable computing device, wherein at least some of the other modules may be worn on parts of the body other than the head, or wherein some of the other modules may not be wearable, but portable instead for instance.

In the context of the present application, a light source is a device capable of producing a configurable light output, wherein the light output may be configured in terms of at least one of colour, colour point, colour temperature, light intensity, to produce a configurable lighting condition, and so on. In some embodiments, the light source may include solid state lighting elements, e.g. light-emitting diodes, arranged to create the aforementioned configurable lighting condition. The light source may be a dedicated lighting device or may form part of an electronic device having a primary function other than providing a lighting effect. For example, the light source may form part of a display device, a household appliance, music equipment, and the like.

FIG. 1 schematically depicts a lighting system arrangement including a lighting system 200 and a wearable computing device 100. In an embodiment, the wearable computing device 100 may be adapted to wirelessly communicate with the lighting system 200, e.g. through a wireless bridge 210 of the lighting system 200 to which a plurality of light sources 201-206 may be communicatively coupled in a wired and/or wireless fashion. Alternatively, the wearable computing device 100 may be adapted to communicate directly with one or more light sources 201-206. Any suitable wireless communication protocol may be used for any of the wireless communication between the wearable computing device 100 and the lighting system 200 and/or between various components of the lighting system 200, e.g., an infrared link, Zigbee, Bluetooth, a wireless local area network protocol such as in accordance with the IEEE 802.11 standards, a 2G, 3G or 4G telecommunication protocol, and so on.

However, in yet another embodiment, the wearable computing device 100 may be adapted to simply detect certain characteristics of the lighting system 200, e.g. a lighting condition produced by one or more light sources 201-206 of the lighting system 200, the identity of the one or more light sources 201-206 of the lighting system 200 producing the lighting condition and so on. This will be explained in more detail below.

Although not specifically shown in FIG. 1, the light sources 201-206 in the lighting system 200 may be controlled in any suitable manner; for instance, each light source 201-206 may have a dedicated controller for receiving control instructions, e.g. through the wireless bridge 210. Alternatively or additionally, the lighting system 200 may comprise one or more central controllers for controlling the light sources 201-206. It should be understood that any suitable control mechanism for controlling the lighting system 200 and the light sources 201-206 may be contemplated. It should furthermore be understood that the lighting system 200 of FIG. 1 is shown to comprise six light sources by way of non-limiting example only; the lighting system 200 may comprise any suitable number of light sources.

In an embodiment, the wearable computing device 100 includes a wireless communication interface 102 for wirelessly communicating with the lighting system 200, e.g. with the wireless bridge 210 or directly with the one or more light sources 201-206. The wearable computing device 100 may optionally comprise a further wireless communication interface 104 for wirelessly communicating with a further network, e.g. a wireless LAN, through which the wearable computing device 100 may access a remote data source such as the Internet. Alternatively, the wearable computing device 100 may include one wireless communication interface that is able to communicate with the lighting system 200 and the further network.

The functioning of wearable computing device 100 may be controlled by a processor 110 that executes instructions, i.e. computer program code, stored in a non-transitory computer readable medium, such as data storage 112. Thus, processor 110 in combination with processor-readable instructions stored in data storage 112 may function as a controller of wearable computing device 100. The processor 110 may further be adapted to control wireless communication interface 102 and, if present, wireless communication interface 104.

In addition to instructions that may be executed by processor 110, data storage 112 may store data that may facilitate the identification of light sources 201-206 of the lighting system 200. For instance, the data storage 112 may function as a database of identification information related to light sources 201-206. Such information may be used by the wearable computing device 100 to identify light sources 201-206 that are detected to be within the aforementioned field of view.

The wearable computing device 100 includes an optical sensor 114 for detecting a lighting condition produced by the lighting system 200 in a particular location, i.e. the location observed by the optical sensor 114, which location typically coincides with the field of view of the wearer of the wearable computing device 100. Such a lighting condition typically relates to the quality of illumination in that location for a particular task to be performed in that location. The lighting condition may for instance be at least one of an illumination level and an illumination colour or illumination colour spectrum. The optical sensor 114 for instance may be a light sensor or an image capturing sensor for capturing one or more images of the aforementioned location.

In an embodiment, the wearable computing device 100 may further be communicatively coupled to one or more external optical sensors 220, which may form part of the lighting system 200, or which may be separate therefrom. The wearable computing device 100 may be communicatively coupled to one or more external optical sensors 220 in a wireless fashion, e.g. by means of the wireless communication interface 102 or the further wireless communication interface 104.

In this embodiment, the wearable computing device 100 receives additional sensor data, i.e. in addition to the sensor data from the optical sensor 114, from the one or more external optical sensors 220 for processing on the wearable computing device 100, e.g. to more accurately determine the lighting condition in a location of interest, i.e. the field of view of the wearer of the wearable computing device 100. The optical sensors 220 may be any suitable type of optical sensors, e.g. light sensors and/or image capture sensors as previously explained.

In an embodiment, the wearable computing device 100 may comprise at least one sensor 116 for detecting an actual user activity in the location of interest, e.g. in the field of view of the sensor 116. For instance, the sensor 116 may be an image capture sensor for capturing one or more images of the location of interest, wherein the processor 110 of the wearable computing device 100 may be adapted to identify the actual user activity from evaluation of the captured images; e.g. by recognizing objects in the images. For instance, a display device may be recognized based on which it may be determined that the actual user activity is television watching or web browsing, a book or e-reader may be recognized based on which it may be determined that the actual user activity is reading, and so on.

Alternatively or additionally, the processor 110 may be arranged to recognize a gesture or motion made by its wearer to indicate the actual user activity the wearer is engaged in, e.g. by means of a motion detecting sensor such as an accelerometer or gyroscope or by image detection using an image capturing sensor. Gesture recognition is known per se and will therefore not be explained in further detail for the sake of brevity only.

The sensor 116 may alternatively be an input sensor, e.g. a button or the like for facilitating the wearer of the wearable computing device 100 to select the actual user activity from a list of options. Such list of options for instance may be displayed on a display 106 of the wearable computing device 100, e.g. a head-mounted display, which may be transparent such that the wearer can observe its environment through the transparent display, e.g. a particular field of view in which one or more of the light sources 201-206 of the lighting system 200 are present.

In case the sensor 116 comprises an image capturing sensor, e.g. a camera, the sensor 116 may be configured to capture images of the environment of wearable computing device 100 from a particular point-of-view. The images could be either video images or still images. In an embodiment, the point-of-view of image capturing device 116 may correspond to the direction in which a see-through display 106 is facing. In this embodiment, the point-of-view of the image capturing device 116 may substantially correspond to the field of view that see-through display 106 provides to the wearer, such that the point-of-view images obtained by image capturing device 116 may be used to determine what is visible to the wearer through the see-through display 106.

In an embodiment, the sensor 116 may be a sound sensor, e.g. a microphone, e.g. for detecting spoken instructions by the wearer of the wearable computing device 100. In this embodiment, the processor 110 may be adapted to receive the sensing output from the sensor 116, to detect the spoken instruction in the received sensing output and to operate the wearable computing device 100 in accordance with the detected spoken instruction, e.g. identify a spoken user activity, e.g. "reading", "television watching", "web surfing" or the like. The spoken instruction alternatively may be to control a user interface, e.g. a cursor on the display 106 to select the actual user activity from a list of activities displayed on the display 106. Other alternatives will be immediately apparent to the skilled person.

In an alternative embodiment, the wearable computing device 100 may be communicatively coupled to one or more external further sensors 230, which may form part of the lighting system 200, or which may be separate therefrom. The wearable computing device 100 may be communicatively coupled to one or more external further sensors 230 in a wireless fashion, e.g. by means of the wireless communication interface 102 or the further wireless communication interface 104.

In this embodiment, the wearable computing device 100 receives sensor data from the one or more further sensors 230 for processing on the wearable computing device 100, e.g. to determine the actual activity its wearer is engaged in within the location of interest. The further sensors 230 may be any suitable type of sensors, e.g. image capturing sensors.

In an embodiment, the wearable computing device 100 may comprise the aforementioned sensor 116 and may further be communicatively coupled to the aforementioned one or more external further sensors 230, such that the wearable computing device 100 may determine the actual user activity in the location of interest from the combined sensor data of the sensor 116 and the one or more external further sensors 230.

The wearable computing device 100 may further include a user interface 108 for receiving input from the user. User interface 108 may include, for example, a touchpad, a keypad, buttons, a microphone, and/or other input devices. The processor 110 may control at least some of the functioning of wearable computing device 100 based on input received through user interface 108. For example, processor 110 may use the input to control how see-through display 106 displays images or what images see-through display 106 displays.

Although FIG. 1 shows various components of wearable computing device 100, i.e., wireless communication interfaces 102 and 104, processor 110, data storage 112, one or more optical sensors 114, one or more sensors 116 for determining a user activity and user interface 108, as being separate from display 106, one or more of these components may be mounted on or integrated into the display 106. For example, an image capturing sensor may be mounted on a see-through display 106, user interface 108 could be provided as a touchpad on a see-through display 106, processor 110 and data storage 112 may make up a computing system in a see-through display 106, and the other components of wearable computing device 100 could be similarly integrated into a see-through display 106.

Alternatively, the wearable computing device may be provided in the form of separate devices that can be worn on or carried by the wearer. The separate devices that make up wearable computing device could be communicatively coupled together in either a wired or wireless fashion.

Moreover, where reference is made to different sensors having the same functionality, e.g. optical sensor 114 and further sensor 116 being an image capturing sensor, it should be understood that the wearable computing device 100 may comprise a single image capturing sensor used for both the lighting condition and user activity determinations.

In an embodiment, the wireless computing device 100 is adapted to provide a user with an alert indicating that a determined lighting condition is non-optimal or unsuitable for a detected user activity. This will be explained in more detail with the aid of FIG. 2, which depicts a flow chart of a method of generating such an alert. The method begins in step 301, e.g. by switching on at least some of the light sources 201-206 and/or the wearable computing device 100, after which the method proceeds to step 302 in which the actual lighting condition is determined with the wearable computing device 100 as previously explained.

In an embodiment, the determination of the actual lighting condition includes the determination of a lighting condition on an object involved with the user activity, such as a display screen of a device, e.g. computer, television, tablet, e-reader or the like, a book page and so on, such as a level of glare on the display or the contrast on a page of a book to be read. In some embodiments, the object may be another (human) being or part of a human body, e.g. hands involved in the user activity. The user activity for instance may be a social activity in this instance. To this end, the processor 110 may be adapted to recognize the object in an image (or sequence of images) captured by the optical sensor 114 and to determine the lighting condition in a region of the captured image(s) corresponding to the object, e.g. focus on this object for the determination of the actual lighting condition.

Glare may be detected in any suitable manner. For instance, optical sensor 114 of the wearable computing device 100 may capture a field of view image, with the processor 110 being arranged to evaluate the image to detect bright regions in the image, which bright regions may be indicative of its wearer being exposed to glare, as the brightness may be caused by light reflecting of an object in the field of view of the user, e.g. a display screen of an electronic device such as a computer, display, tablet or the like, a printed article such as a book, newspaper or magazine, and so on. Alternatively, the wearable computing device 100 may include an inward facing optical sensor for detecting pupillary miosis (constriction), which is indicative of the wearer being overexposed to light in his or her field of view. Other suitable approaches for detecting a glare condition will be immediately apparent to the skilled person.

In step 303, the wearable computing device 100 determines the user activity that its wearer is engaged in. This may be done in any suitable manner, e.g. by way of the aforementioned object recognition, in which a particular object is linked to a particular user activity, e.g. a book is linked to reading, a flat screen television is linked to television watching, and so on, with the processor 110 being adapted to query a data structure comprising these links. In an embodiment, the data structure is stored in data storage 112. Alternatively, the wearable computing device may determine the user activity based on a user input, e.g. a gesture, movement, spoken instruction or physical interaction with the user interface 108 to specify the user activity, e.g. by selecting a user activity from a list of such activities displayed on the display 106, and so on.

It is noted that although step 303 is shown sequentially to step 302, it should be understood that these steps may be executed in any order, e.g. in parallel or sequentially with step 303 preceding or succeeding step 302.

In step 304, the processor 110 of the wearable computing device 100 compares the actual lighting condition to a suitable lighting condition for the determined user activity. Such a suitable lighting condition may for instance be stored in a data structure linking a user activity to a suitable lighting condition for this activity. In an embodiment, such a data structure may be stored in data storage 112. A suitable lighting condition may be an optimal lighting condition for the user activity or may be defined as a range of lighting conditions that are considered appropriate for the detected user activity. The suitable lighting condition may be defined in any suitable manner, e.g. a default lighting condition or a user-defined lighting condition, as will be explained in more detail later.

In step 305, the processor 310 compares the determined actual lighting condition with the suitable lighting condition to determine if the actual lighting condition is appropriate for the identified user activity. For instance, if the actual lighting condition, e.g. an actual illumination level, level of glare, contrast level or illumination spectral composition, falls within a range considered suitable for the detected activity, no further action needs to be taken and the method may terminate in step 307.

On the other hand, the comparison may reveal that the actual lighting level is considered unsuitable for the detected user activity. For instance, it may be determined that a level of glare exceeds a defined threshold, e.g. a user-defined threshold, a threshold derived from historical user data, a factory-defined threshold, and so on. Such a threshold may for instance correspond to an acceptable level of glare in a field of view, which may be expressed as an absolute level of brightness at the object generating glare, a level of brightness at the object generating glare relative to the overall brightness in the field of view, an amount or rate of pupillary miosis, and so on. Many other suitable definitions of such a threshold will be immediately apparent to the skilled person.

In case of the comparison revealing that the actual lighting level is considered unsuitable for the detected user activity, the method proceeds to step 306 in which the wearer of the wearable computing device 100 is presented with a warning signal or alert indicating this unsuitability, such that the wearer for instance may manually adjust the lighting conditions in the location in which the user activity is to take place. The alert may be provided in any suitable manner, e.g. as an audible warning signal using a loudspeaker of the wearable computing device 100, a visual warning signal, e.g. using the display 106 or a light source, e.g. a LED, of the wearable computing device 100, a sensory warning signal, e.g. a vibration, and so on. Upon generation of the alert or warning signal, the method may terminate in step 307.

In the above embodiment, the wearable computing device 100 is adapted to alert its wearer that a lighting condition for an activity in which the wearer is engaged in is non-optimal, i.e. unsuitable. This therefore allows the wearer of the wearable computing device 100 to adjust the light sources responsible for the creation of the lighting condition, thereby adjusting the lighting condition. This process may be repeated until the wearable computing device 100 has determined that the actual lighting condition is suitable, e.g. optimal, for the detected user activity.

In an embodiment, following the generation of the warning signal, the user may respond by looking at the one or more light sources responsible for generating the actual lighting condition. The wearable computing device 100 may identify such a light source, e.g. by identifying the light source in the field of view of the optical sensor 114, for instance by detecting and decoding a coded light signal generated by the light source with the processor 110, which code may include an identifier of the light source, by recognizing the light source in a library of light sources with the processor 110, e.g. using the shape of the light source or by identification of an optical marker on the light source, and so on. Many other suitable identification techniques will be apparent to the skilled person. The user may provide the wearable computing device 100 with an instruction to adjust the settings of the identified light source, e.g. a spoken instruction, gesture, head movement, a physical instruction provided by contacting the wearable computing device 100, and so on, in response to which the wearable computing device 100 generates a control signal for the identified light source and transmits this control signal to the identified light source as previously explained.

However, in an alternative embodiment, the wearable computing device 100 may be adapted to invoke automatically adjustment of the actual lighting condition, such that user intervention may not be required. A flow chart of a method implementing this alternative embodiment is shown in FIG. 3. Steps 301-305 are identical to steps 301-305 in FIG. 2 such that these steps will not be explained again for the sake of brevity, with the exception that step 302, in addition to the aforementioned determination of the actual lighting condition, may further comprise the identification of one or more light sources 201-206 responsible for the creation of the actual lighting condition.

The light sources 201-206 may be identified in any suitable manner. For instance, each light source may transmit coded light, e.g. light including a modulation that is characteristic for that particular light source, i.e. identifying the particular light source. The coded light may be received by one of the sensors of the wearable computing device 100, e.g. by an the image capturing sensor, a photoelectric sensor and so on, and the corresponding signal may be decoded by the processor 110 to identify the corresponding light source. Alternatively, each light source may comprise a unique visible marker, such that when an image of a field-of-view is captured by an image capturing sensor of the wearable computing device 100, the processor 110 may process the captured image in order to recognize the unique visible markers and identify the one or more light sources accordingly. In yet another embodiment, the wearable computing device 100 may store, e.g. in data storage 112, known locations of the light sources 201-206, e.g. in the form of images of the light sources 201-206 in the space in which the light sources 201-206 are placed, such that the light sources may be identified by comparing the image of the field of view captured with the image capturing sensor with the images stored in data storage 112. Other suitable identification techniques will be apparent to the skilled person.

If in step 305 it is determined that the actual lighting condition as detected in step 302 is unsuitable for the user activity as detected in step 303, the method proceeds to step 406 in which the processor 110 calculates, for the identified light sources 201-206 involved in the generation of the actual lighting condition, how the luminous output of these light sources should be adjusted to convert the actual lighting condition into a suitable lighting condition. This for instance may be achieved by decomposing the detected actual lighting condition to estimate the individual contributions of the involved light sources 201-206 to the actual lighting condition or by communicating with the involved light sources 201-206, e.g. through a wireless bridge 210 of the lighting system 200, to retrieve the actual settings of the involved light sources 201-206.

The method then proceeds to step 406 in which the wearable computing device 100 communicates the control signal to the involved light sources 201-206, either directly or through a central communication device of the lighting system 200, e.g. a wireless bridge 210, such that the involved light sources 201-206 may adjust their luminous output in step 408 in accordance with the received instructions in step 407 in order to change the actual lighting condition such that it becomes a suitable lighting condition for the detected user activity, after which the method may terminate in step 307 as before.

Figure 2:
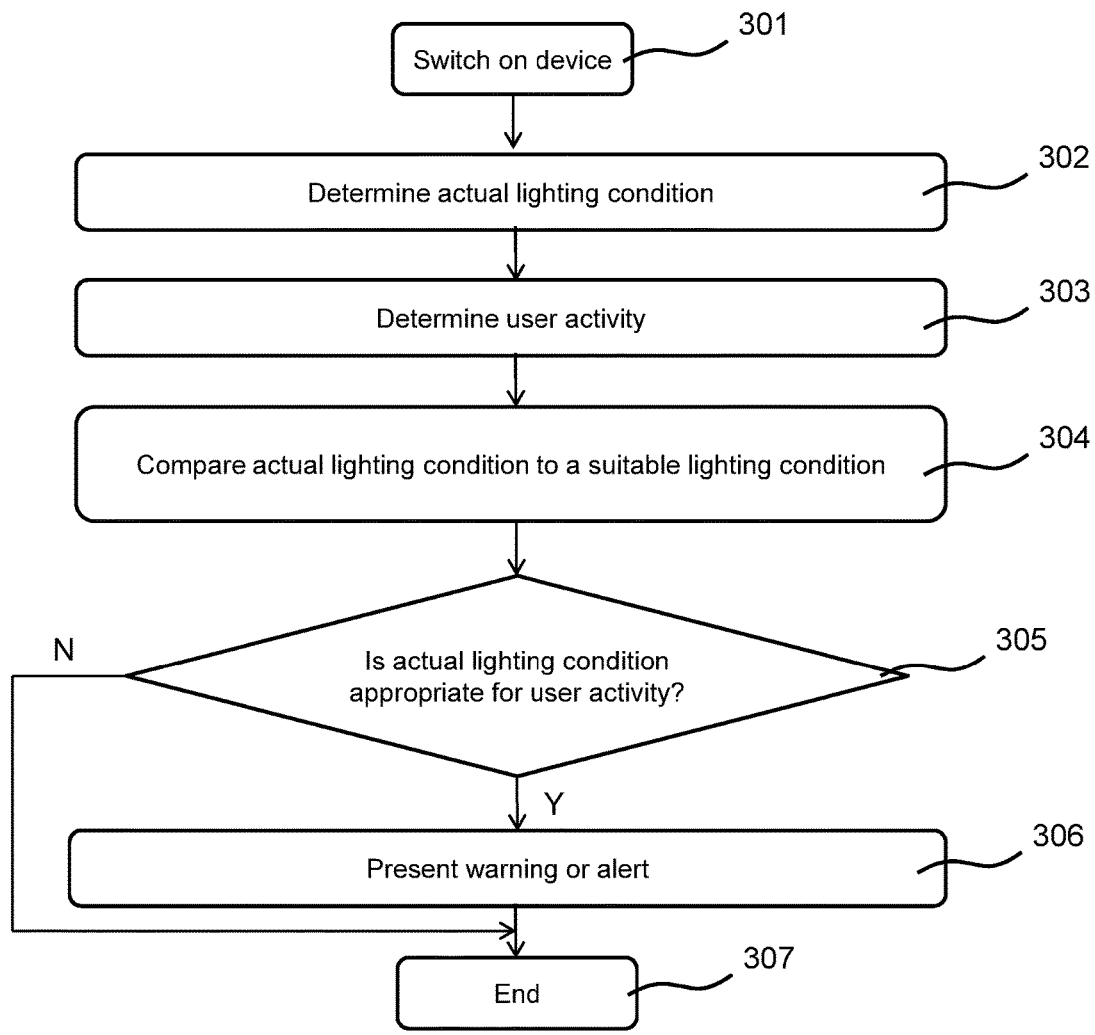
FIG. 2 is a flow chart of a method for improving a lighting condition according to an embodiment.
Figure 3:
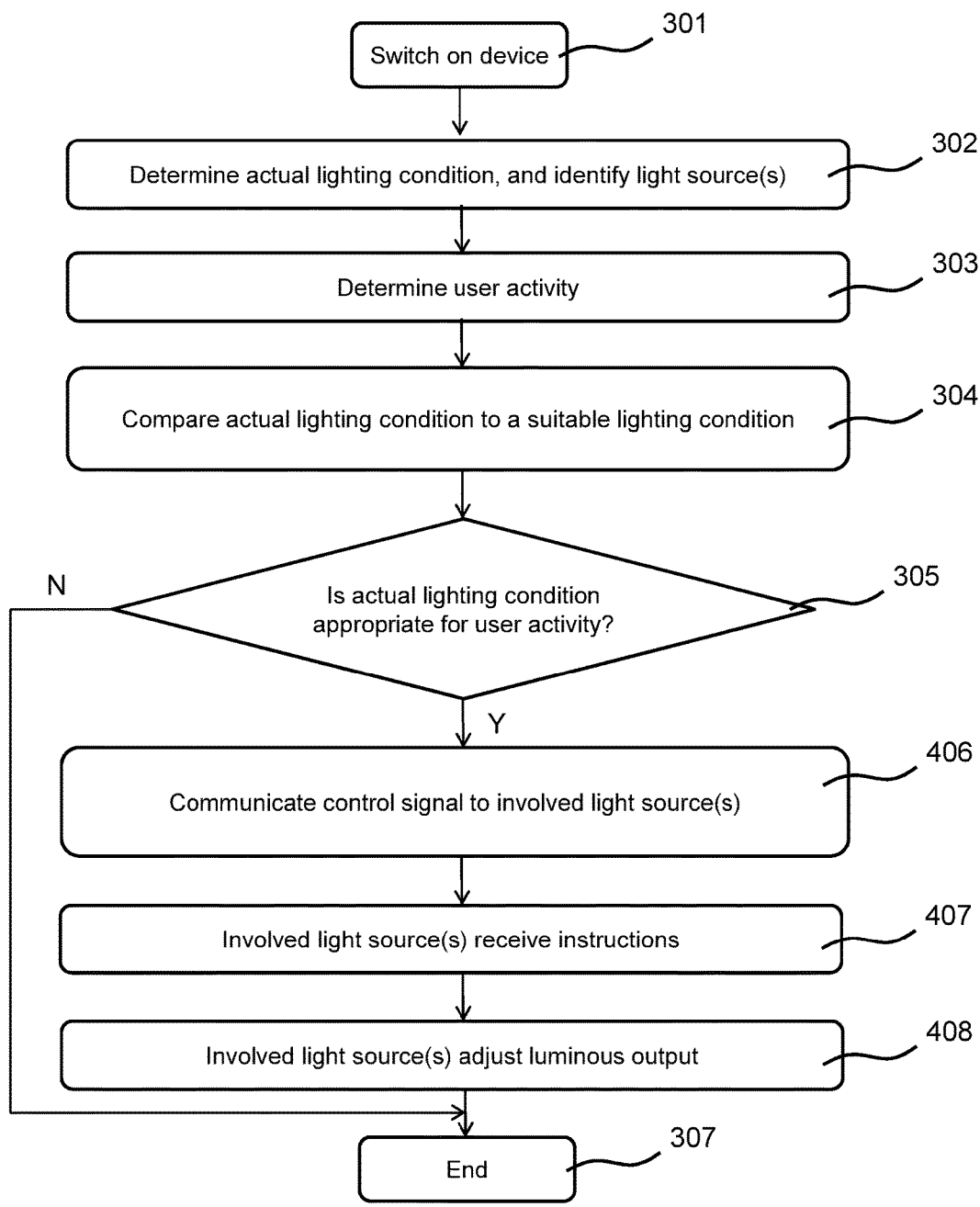
FIG. 3 is a flow chart of a method for improving a lighting condition according to another embodiment.

At this point, it is noted that the method of FIG. 3 may be amended by including step 306 of FIG. 2 in between steps 305 and 406. In this embodiment, rather than having the processor 110 calculate an appropriate control signal for controlling the one or more light sources 201-206 involved in the generation of the actual lighting condition, the wearer of the wearable computing device 100 may provide the wearable computing device 100 with a lighting condition adjustment instruction, e.g. by means of a gesture, spoken instruction or physical interaction, e.g. touch, or any other suitable manner of conveying such an instruction to the wearable computing device 100 as previously explained, in which case the processor 110 generates the control instruction in response to the received user-generated lighting condition adjustment instruction. For instance, the user may make a gesture indicating that a spot size requires adjusting, e.g. a gesture indicating the desired spot size, or may use a spoken instruction to indicate a desired adjustment, e.g. light source 201 off, light source 203 on, dim light source 206 and so on. Many other examples of such a user-generated lighting condition adjustment instruction will be apparent to the skilled person.

In the above embodiments of the method, the method terminates after the comparison of the actual lighting condition with the suitable lighting condition of the determined user activity, and the generation of the alert or control signal by the processor 110 if necessary, i.e. when the actual lighting condition is considered unsuitable for the determined user activity. This is particularly suitable if the determined user activity is performed in a single location and/or the (ambient) lighting conditions of the location(s) in which the user activity is performed are relatively constant.

Figure 4:
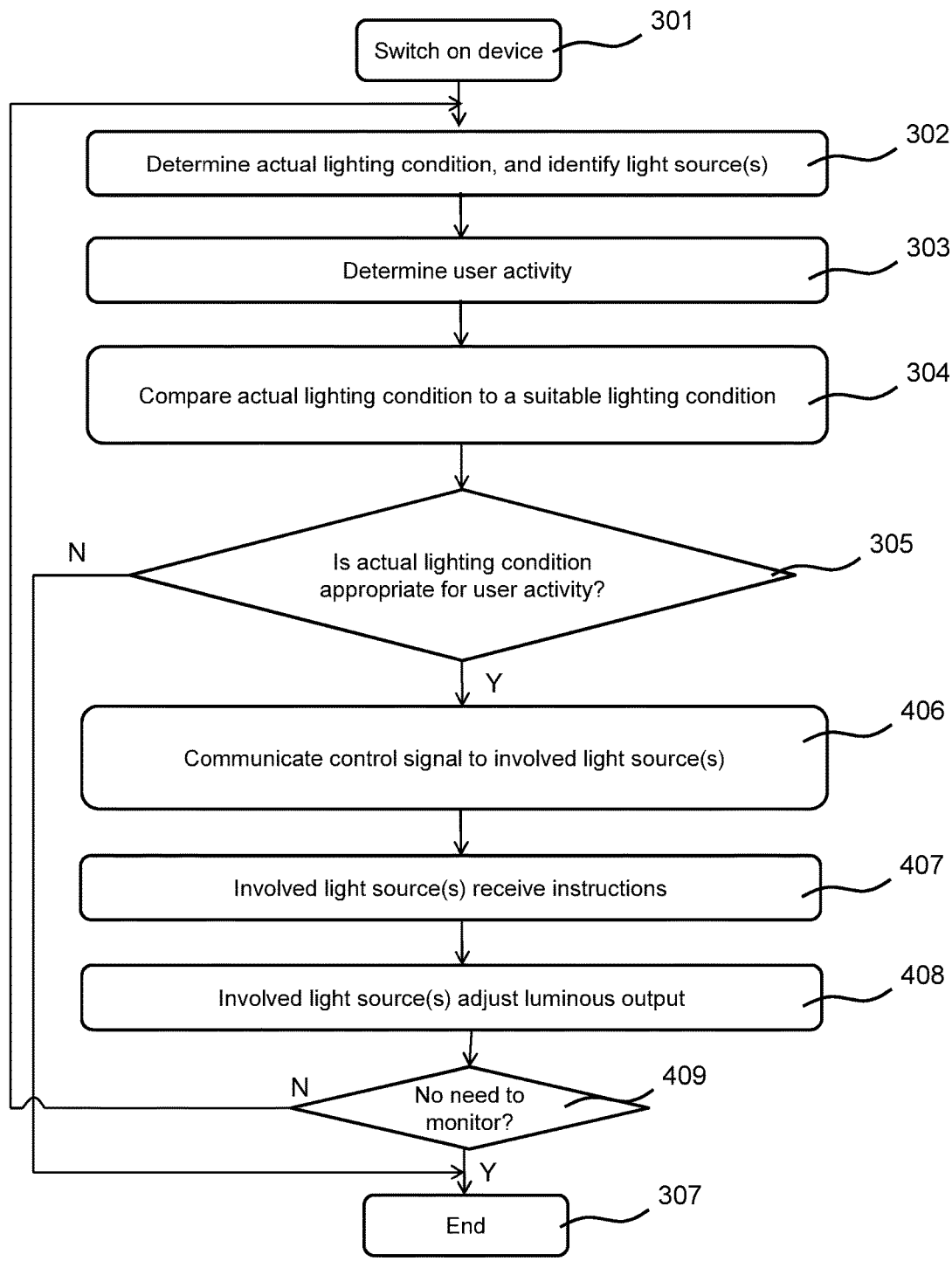
FIG. 4 is a flow chart of a method for improving a lighting condition according to yet another embodiment.

However, in situations where at least one of the location and the (ambient) lighting conditions may be subject to change, it may be desirable to constantly or periodically monitor (changes to) the actual lighting condition to ensure that the actual lighting condition remains suitable for the determined actual user activity. To this end, the method may be amended as shown by way of non-limiting example in FIG. 4 by the inclusion of a loop that forces the method revert back to step 302 after the generation of the control signal and the controlling of the light sources in accordance with the generated control signal as previously explained, or after the generation of the alert or warning signal in step 306 as shown in FIG. 2, such that the actual lighting condition is reassessed. In such subsequent evaluations, step 303 of course may be omitted as the actual lighting condition is reassessed for an already known user activity. This for instance can be used to compensate for changes in ambient lighting conditions or to create a mobile lighting condition that can follow the user as the user is on the move, in particular if the lighting condition is created by light sources that travel with the user, e.g. light sources mounted on the user and/or on a device involved in the user activity, e.g. a reading light mounted on a tablet or e-reader and so on.

Upon determination in step 409 that there no longer is a need to continuously or periodically monitor the actual lighting condition, e.g. because the user is stationary, an ambient lighting condition has become stable, e.g. darkness has set in, and/or the user has ended the determined user activity, e.g. by switching off a device involved in the user activity or by otherwise signaling the wearable computing device 100 that the activity has ended, e.g. by providing the wearable computing device 100 with a user command to this effect, the method may terminate in step 307 as explained above.

Figure 5:
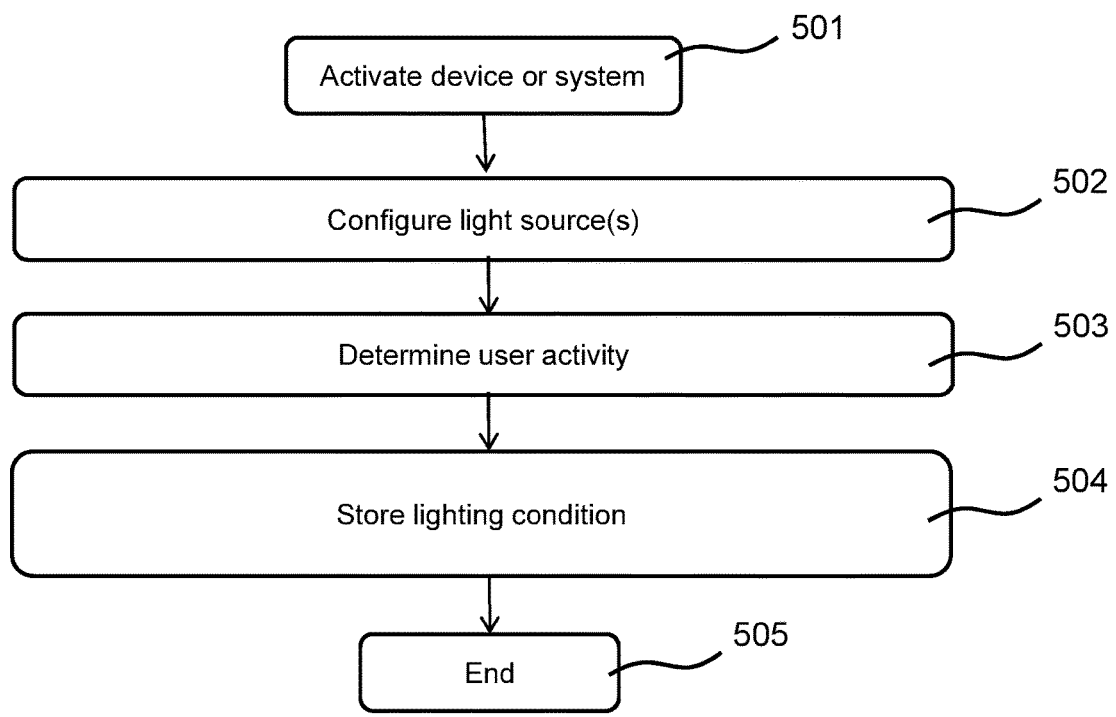
FIG. 5 is a flow chart of a method of defining a suitable lighting condition to be used in a method for improving a lighting condition.

As previously mentioned, a user may define a suitable lighting condition for a particular user activity for storage on the wearable computing device 100 or a data storage device communicatively coupled or otherwise accessible by the wearable computing device 100. A flowchart of an example method of creating such a user-defined suitable lighting condition is shown in FIG. 5. The method starts in step 501, e.g. by activating the wearable computing device 100 and/or the lighting system 200, after which the method proceeds to step 502 in which the user configures the one or more light sources 201-206 of the lighting system 200 to produce the desired, i.e. suitable, lighting condition, which lighting condition is determined by the wearable computing device in the same manner as previously explained for step 302.

In step 503, the wearable computing device 100 determines the user activity associated with the determinant suitable lighting condition as previously explained in respect of step 303, for instance by the user specifying the user activity using a suitable command. Upon determination of the associated user activity, the wearable computing device 100 may store the actual lighting condition as the suitable lighting condition for the associated user activity in step 504, for instance by creating or amending a suitable data structure, which data structure for instance may be stored in data storage 112. In this manner, the wearable computing device 100 for instance may create a database of personal lighting preferences associated with particular user activities.

In the above embodiments, the actual lighting condition is a function of the user activity only. However, in at least some embodiments, the actual lighting condition may be a function of both user activity and user vigilance, wherein the wearable computing device 100 is further adapted to monitor user vigilance and generate an alert and/or control signal for adjusting an actual lighting condition, e.g. increase a lighting level, upon detection of a change in user vigilance, e.g. decreased user vigilance. User vigilance may be detected in any suitable manner, e.g. by monitoring user motion, user response times and so on using one or more of the sensors of the wearable computing device 100.

Aspects of the present invention may be embodied as a lighting system kit, wearable computing device, method or computer program product. A lighting kit typically comprises an embodiment of a lighting system 200 and a wearable computing device 100, wherein the lighting system 200 is adapted to communicate with the wearable computing device 100 and is responsive to a control signal generated by the wearable computing device for controlling at least one of the light sources 201-206 as previously explained. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out the methods of the present invention by execution on the processor 110 may be written in any combination of one or more programming languages, including an object oriented programming language such as Java, Smalltalk, C++ or the like and conventional procedural programming languages, such as the "C" programming language or similar programming languages. The program code may execute entirely on the processor 110 as a stand-alone software package, e.g. an app, or may be executed partly on the processor 110 and partly on a remote server. In the latter scenario, the remote server may be connected to the wearable computing device 100 through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor 110 of the wearable computing device 100, such that the instructions create means for implementing the functions/acts specified in the flowchart and/or block diagram block or blocks. These computer program instructions may also be stored in a computer-readable medium that can direct the wearable computing device 100 to function in a particular manner.

The computer program instructions may be loaded onto the processor 110 to cause a series of operational steps to be performed on the processor 110, to produce a computer-implemented process such that the instructions which execute on the processor 110 provide processes for implementing the functions/acts specified in the flowchart and/or block diagram block or blocks.

The lighting system 200 may be provided as a lighting system kit together with a computer program product, e.g. an app, for implementing embodiments of the method 300. The computer program product may form part of a wearable computing device 100, e.g. may be installed on the wearable computing device 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A system for improving a lighting condition, the system comprising:
    a wearable computing device including an optical sensor configured to determine an actual lighting condition in a field of view of a wearer of the wearable computing device; and:
    a further sensor arrangement configured to determine an actual user activity, said actual user activity being associated with a suitable lighting condition for performing said user activity;
    wherein the wearable computing device is further configured to:
        compare the actual light condition with the suitable light condition; and
        generate a signal if the actual light condition deviates from the suitable light condition,
    and wherein the further sensor arrangement comprises at least one of a first further sensor integral to the wearable computing device and at least one second further sensor communicatively coupled to the wearable computing device.

2. The system of claim 1, wherein the wearable device being configured to generate the signal comprising generating a warning signal with said wearable computing device for its user.

3. The system of claim 1, wherein the optical sensor forms part of an optical sensor arrangement further comprising at least one further optical sensor communicatively coupled to the wearable computing device.

4. The system of claim 1, wherein the optical sensor is configured to determine a further lighting condition,
    associate a further user activity with the further lighting condition; and
    store the further lighting condition as the suitable lighting condition for said further user activity.

5. The system of claim 1, wherein the further sensor arrangement being configured to determine the user comprises detecting a user input indicative of said user activity.

6. The system of claim 1, wherein the wearable device being configured to generate the signal comprises being configured to generate a control signal for adjusting a setting of at least one light source in order to create the suitable lighting condition.

7. The system of claim 6, wherein the wearable computing device is further configured to identify the at least one light source.

8. The system of claim 6, wherein during said user activity the optical sensor arrangement is configured to:
    determine a further actual light condition;
    compare the further actual light condition with the suitable light condition; and
    generate a further control signal for adjusting a setting for at least one light source in order to create the suitable lighting condition if the further actual light condition deviates from the suitable light condition.

9. The system of claim 6, wherein the wearable device is configured to communicate the control signal to said at least one light source and adjust the at least one light source in accordance with the control signal.

10. The system of claim 9, wherein the suitable lighting condition comprises a glare threshold, and wherein being configured to adjust the at least one light source in accordance with the control signal comprises adjusting the at least one light source to reduce the glare produced by said at least one light source to below said glare threshold.

11. A non-transitory computer readable medium containing computer program code stored therein for improving a lighting condition with a wearable computing device including an optical sensor for determining an actual lighting condition in a field of view of a wearer of the wearable computing device, the computer code when executed on a processor of the wearable computing device, causes a computer processor to perform steps comprising:
    determining the actual light condition with the optical sensor;
    determining an actual user activity with a further sensor arrangement, said user activity being associated with a suitable lighting condition for performing said user activity;
    comparing, on the wearable computing device, the actual light condition with the suitable light condition; and
    generating a signal with the wearable device if the actual light condition deviates from the suitable light condition,
    wherein the further sensor arrangement comprises at least one of a first further sensor integral to the wearable computing device and at least one second further sensor communicatively coupled to the wearable computing device.

12. A wearable computing device comprising:
    a data storage comprising non-transitory computer readable medium containing computer program code for improving a lighting condition with the wearable computing device;
    an optical sensor for determining an actual lighting condition in a field of view of a wearer of the wearable computing device; and
    a processor adapted to execute the computer program code of said computer program product, the execution comprising implementing steps comprising:
        determining the actual light condition with the optical sensor;
        determining an actual user activity with a further sensor arrangement, said user activity being associated with a suitable lighting condition for performing said user activity;

comparing, on the wearable computing device, the actual light condition with the suitable light condition; and generating a signal with the wearable device if the actual light condition deviates from the suitable light condition, wherein the further sensor arrangement comprises at least one of a first further sensor integral to the wearable computing device and at least one second further sensor communicatively coupled to the wearable computing device;

wherein the optical sensor optionally is at least one of a light sensor and an image capturing sensor.

13. The wearable computing device of claim 12, further comprising a further sensor for determining a user activity, wherein the further sensor for determining the user activity optionally is at least one of an image capturing sensor and a motion sensor.

14. A lighting system kit comprising a lighting system including at least one light source and the wearable computing device of claim 12, wherein the lighting system is adapted to communicate with the wearable computing device and is responsive to a control signal generated by the wearable computing device for controlling the at least one light source.

* * * * *